C. E. MEAD.
GENERATOR SUSPENSION MEMBER.
APPLICATION FILED NOV. 15, 1911.
1,105,988.   Patented Aug. 4, 1914.
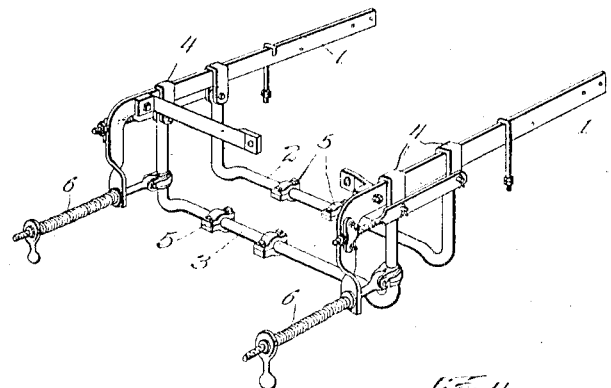
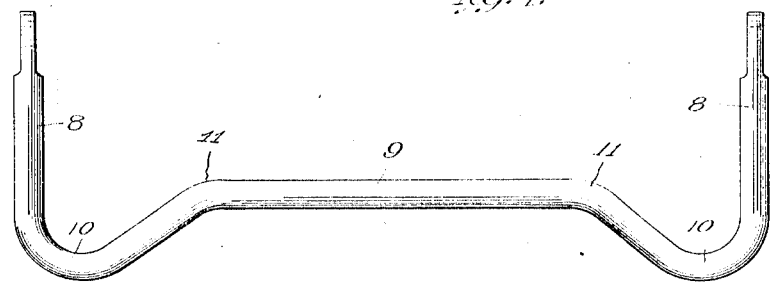
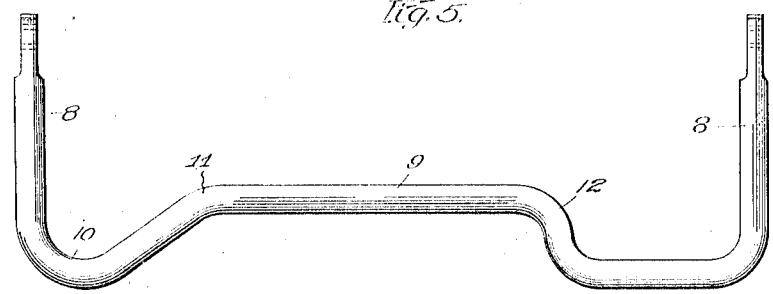
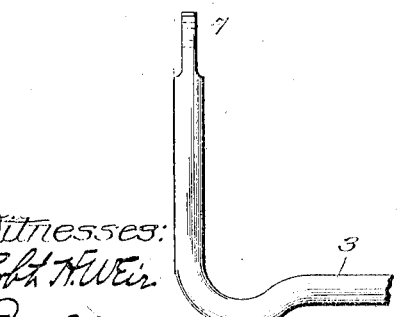
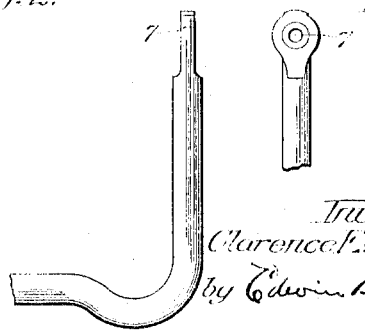

UNITED STATES PATENT OFFICE.

CLARENCE E. MEAD, OF NIAGARA FALLS, NEW YORK, ASSIGNOR, BY MESNE ASSIGNMENTS, TO CENTRAL TRUST COMPANY OF NEW YORK, A CORPORATION OF NEW YORK, TRUSTEE.

GENERATOR-SUSPENSION MEMBER.

1,105,988.  Specification of Letters Patent.  Patented Aug. 4, 1914.

Application filed November 15, 1911. Serial No. 660,480.

*To all whom it may concern:*

Be it known that I, CLARENCE E. MEAD, a citizen of the United States, residing at Niagara Falls, in the county of Niagara and State of New York, have invented new and useful Improvements in Generator-Suspension Members, of which the following is a full, clear, concise, and exact description, reference being had to the accompanying drawing, forming a part of this specification.

This invention relates to improvements in generator suspension members.

There have been developed in the prior art generator suspensions in which a car lighting generator is slidably supported by substantially parallel U-shaped members or slings. These so-called U-shaped members are made of depending pivoted links and cross-bars connected to the lower ends of said links. The cross-bars have been either detachably or integrally connected to the depending links. The present invention relates to this general type of suspension members and to the general form in which the cross-bars are integrally connected to the depending links.

The object of my invention is to provide improved suspension members of the type referred to.

The invention may be embodied in various forms.

In the accompanying drawings I have illustrated several embodiments.

Referring to the drawings: Figure 1 is a perspective view of a generator suspension showing one form of improved generator suspension members or slings. Fig. 2 is an enlarged front elevation of one of the slings shown in Fig. 1. Fig. 3 is a fragmentary side elevation of the member shown in Fig. 2. Fig. 4 is an elevation of a further form of an improved generator suspension member. Fig. 5 is a modified form of the type shown in Fig. 4, adapted to be used with the member shown in Fig. 4.

The generator suspension as shown in Fig. 1 comprises substantially parallel bars 1 adapted to be secured to a car truck in any suitable manner, so that the suspension as a whole will project beyond the end of a car truck. The suspension is adapted to be applied to either a wooden car truck or to a steel car truck. The generator supporting members or slings 2 and 3 are pivotally supported by parallel suspension bars 1 in any suitable manner. In the drawing stirrups 4 are illustrated which are adapted to slide back and forth longitudinally with respect to the suspension bars 1, in order to adjust the generator (not shown) toward or away from the driving axle, it being understood that the generator is driven by a belt from a pulley clamped to one of the car axles in the customary manner.

The generator is adapted to be carried by the substantially horizontal portions of the suspension members 2 and 3, and is adapted to be moved back and forth along the same to adjust the generator transversely with respect to the suspension as a whole for the purpose of alining the driven pulley with the driving pulley. The generator is adapted to be held in such adjusted position by means of clamps 5. The tension devices 6, when properly adjusted, normally tend to swing the generator away from the driving axle to maintain the proper belt tension. It is desirable to have the outward pull of the spring tensioning devices applied as low as possible so as to secure the maximum turning moment for a given pair of springs, and also to avoid obliquity in the tension rods. It is also desirable to locate the generator at a certain height above the rails and road bed to fulfil the customary requirements in the way of suitable clearance between the belt, car body, truck members, brake rigging and other parts of the apparatus.

In order to fulfil the usual requirements and at the same time to retain the various advantageous features referred to above, and in order to reduce the liability of breakage of the suspension members, I provide bends of large radius where the vertical links are joined to the substantially horizontal cross-bars. Furthermore, in forming these bends the bar from which the suspension member is formed is bent through an angle greater than a right angle, whereby the horizontal middle portion is higher than the bends. The vertical links join the horizontal portions by reverse curves. The bends in the metal are very gradual, as will be clearly apparent from an inspection of Fig. 2. By making the bends 10 very gradual, that is— by making the radius of curvature comparatively large the structure is not weakened by undue distortion of the metal such as would be occasioned by sharp right angled bends. From this figure it will also be seen that the supporting member 3 is adapted to be pivotally supported at its upper ends at the points 7 and that the vertical portions extend down straight nearly as low as the horizontal middle portion of the bar. This permits the tension device to be applied to said member nearly in line with the horizontal middle portion. At the same time the middle portion is sufficiently high to properly support the generator.

In Fig. 4 the vertical portions 8 are also joined to the horizontal portion 9 by reverse curves, the radius of curvature of the upward bends 10 being comparatively large. As illustrated, the radius of curvature of the downward bends 11 at opposite ends of the middle portion is comparatively small. This, however, does not result in an undesirable distortion of the metal at this point as the bends 11 are through a relatively small angle.

The form illustrated in Fig. 5 is similar to that illustrated in Fig. 4, except that the right hand end of the horizontal portion 9 is bent down at the point 12 more abruptly in order to provide a certain clearance space for the driving belt (not shown). This supporting member, when assembled as part of a generator suspension, is suspended nearer to the car truck than the other member, which is of the form shown in Fig. 4.

Both the forms shown in Figs. 4 and 5 are provided with middle portions which are raised considerably higher than the lowermost portions of the sling as a whole. The form shown in Fig. 4 is a preferred form, as the tension device may be attached very low on the vertical portion 8 and at the same time the generator is raised sufficiently high to fill all the necessary requirements. Thus, a very effective spring leverage or spring tension is provided.

The invention is not limited to the details of construction herein described, but is intended to cover broadly suitable equivalent means for accomplishing the desired results, as long as said equivalent means fall within the scope of the appended claims.

I claim as my invention:

1. Supporting means for a car lighting generator, comprising a rod having vertical end portions and a horizontal middle portion, there being an upward bend between said portions.

2. Supporting means for a car lighting generator, comprising a rod having vertical end portions and a horizontal middle portion connected thereto by wide bends, said middle portion being higher than said bends.

3. A support for a car lighting generator having vertical end portions and a horizontal middle portion connected thereto by reverse bends.

4. A support for a car lighting generator having vertical end portions and a horizontal middle portion connected thereto by wide bends, the ends of said middle portion being bent downwardly to meet said bends.

5. Supporting means for a car lighting generator, comprising a rod having substantially parallel end portions and a transverse middle portion, said middle portion being higher than the bends connecting the various portions.

6. Supporting means for a car lighting generator having a horizontal portion to receive the generator and vertical end portions suspended from above, said horizontal portion being joined to said end portions by reverse curves.

7. Supporting means for a car lighting generator, comprising a bar having a middle portion adapted to support a generator, and having vertical end portions for supporting said middle portion, said vertical portions extending approximately as low as said middle portion, and said vertical and middle portions being joined by upward bends whereby a tension device may be applied to said vertical portions about in line with said middle portion.

8. A generator suspension bar having vertical portions and a horizontal middle portion connected thereto by upward bends.

9. A generator suspension comprising two members pivotally supported and arranged substantially parallel, each member comprising depending end portions and a horizontal middle portion joined thereto in reverse curves.

10. A generator suspension comprising two members pivotally supported and arranged substantially parallel, each member comprising depending vertical portions and a horizontal connecting portion arranged higher than the lower parts of said vertical portions, whereby a tension device may be secured to the vertical portions of one of said members at a point substantially in line with its horizontal portion.

11. A generator suspension comprising two members pivotally supported and arranged substantially parallel, each of said members comprising horizontal portions connected to the end portions by reverse curves, one reverse curve of one of said members being more abrupt than the remaining reverse curves to provide a certain clearance.

12. A generator suspension comprising a pair of substantially parallel supporting means, each suspended from above and each comprising a horizontal middle portion, diagonal portions extending downwardly and outwardly therefrom, vertical end portions and bends of a large radius connecting said vertical portions with said diagonal portions.

13. In a support for a car lighting generator, a suspension member comprising end members, and a transverse member extending substantially at right angles to said end members and being joined to said end members by upward bends having a large radius of curvature.

14. A suspension member for a car lighting generator comprising end members, and a connecting member between said end members, said connecting member extending substantially at right angles to said end members and being joined thereto by upward bends whereby weakening of the suspension member by distortion of the metal is avoided.

15. Supporting means for a car-lighting generator comprising a rod having substantially parallel end portions, and a transverse middle portion, said middle portion being connected to said end portions by upward bends.

In witness whereof, I have hereunto subscribed my name in the presence of two witnesses.

CLARENCE E. MEAD.

Witnesses:
E. R. KING,
GEO. B. JONES.

Copies of this patent may be obtained for five cents each, by addressing the "Commissioner of Patents, Washington, D. C."